(12) United States Patent
Lavallee et al.

(10) Patent No.: US 10,789,426 B2
(45) Date of Patent: *Sep. 29, 2020

(54) PROCESSING NATURAL LANGUAGE TEXT WITH CONTEXT-SPECIFIC LINGUISTIC MODEL

(71) Applicant: Nuance Communications, Inc., Burlington, MA (US)

(72) Inventors: Jean-Francois Lavallee, Montreal (CA); Kenneth W. D. Smith, London (GB)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,453

(22) Filed: Oct. 22, 2018

(65) Prior Publication Data
US 2019/0228065 A1  Jul. 25, 2019

Related U.S. Application Data

(63) Continuation of application No. 14/753,169, filed on Jun. 29, 2015, now Pat. No. 10,108,603.
(Continued)

(51) Int. Cl.
*G06F 17/27* (2006.01)
*G06F 40/284* (2020.01)
(Continued)

(52) U.S. Cl.
CPC .......... *G06F 40/284* (2020.01); *G06F 40/211* (2020.01); *G06F 40/30* (2020.01)

(58) Field of Classification Search
CPC ... G06F 17/277; G06F 17/271; G06F 17/2785
(Continued)

(56) References Cited

U.S. PATENT DOCUMENTS 8,903,714 B2 * 12/2014 Quast ..................... G06F 16/24
704/9
9,672,205 B2 *  6/2017 Miller .................. G06F 40/295
(Continued)

FOREIGN PATENT DOCUMENTS

WO  WO-02056196 A2 *  7/2002 ............. G06F 40/30

*Primary Examiner* — Edwin S Leland, III
(74) *Attorney, Agent, or Firm* — Brian J. Colandreo; Michael T. Abramson; Holland & Knight LLP

(57) ABSTRACT

Aspects of the disclosure are directed to natural language processing. An input interface of a computing device receives input (e.g., speech input) and generates a digital signal corresponding to that input. Text corresponding to the digital signal is obtained, and the text is processed using each of a context-free and a context-specific linguistic model to generate linguistic processing results for that text. The text and linguistic processing results may be processed using a NLU model to generate an NLU recognition result corresponding to the input received at the input interface. The text and the linguistic processing results may also be annotated and used to train a NLU model. The linguistic processing results may relate to, e.g., the tokenization of portions of the text, the normalization of portions of the text, sequences of normalizations for portions of the text, and rankings and prioritization of the linguistic processing results.

20 Claims, 9 Drawing Sheets

Related U.S. Application Data

(60) Provisional application No. 62/169,305, filed on Jun. 1, 2015.

(51) Int. Cl.
*G06F 40/30* (2020.01)
*G06F 40/211* (2020.01)

(58) Field of Classification Search
USPC .............................................. 704/9
See application file for complete search history.

(56) References Cited

U.S. PATENT DOCUMENTS

| | | | | |
|---|---|---|---|---|
| 2002/0123891 | A1* | 9/2002 | Epstein | G10L 15/197 704/235 |
| 2003/0167266 | A1* | 9/2003 | Saldanha | G06F 17/2229 |
| 2007/0156392 | A1* | 7/2007 | Balchandran | G06F 40/20 704/9 |
| 2012/0059706 | A1* | 3/2012 | Goenka | G06F 17/30569 705/14.41 |
| 2013/0339005 | A1* | 12/2013 | Zhang | G16B 40/00 704/9 |
| 2014/0365232 | A1* | 12/2014 | Sadeghi | G06F 19/345 705/2 |
| 2015/0120287 | A1* | 4/2015 | Stern | G10L 15/183 704/231 |
| 2015/0302003 | A1* | 10/2015 | Yadgar | G10L 15/19 704/9 |
| 2016/0350280 | A1* | 12/2016 | Lavallee | G06F 40/284 |

\* cited by examiner

PROCESSING NATURAL LANGUAGE TEXT WITH CONTEXT-SPECIFIC LINGUISTIC MODEL

CROSS-REFERENCE TO RELATED APPLICATION

This application is a continuation application of U.S. patent application Ser. No. 14/753,169 filed Jun. 29, 2015 and claims the benefit of U.S. Provisional Patent Application No. 62/169,305 entitled "Processing Natural Language Text with Context-Specific Language Model" and filed on Jun. 1, 2015 which are incorporated by reference herein in their entirety.

TECHNICAL FIELD

The present application generally relates to natural language text processing and relates, in particular, to using a context-specific linguistic model to process natural language text.

BACKGROUND

Common techniques for improving the performance of natural language processing systems include tokenization and normalization during a processing phase prior to performing semantic analysis. Tokenization splits input text into various segments, and normalization brings the format of those segments into alignment with some standard forms. By reducing the variability of input text, the amount of data a natural language processing system requires to recognize some concept is thereby reduced. As an example, normalization reduces the number of cases a developer must consider when writing text processing rules.

Current text processors, however, are often generic processors that are developed without knowledge of or regard to the context in which the natural language processing system operates.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome the challenges discussed above, and to overcome other challenges that will be apparent upon reading and understanding the present specification, aspects described herein are directed toward processing natural language input using each of a context-free linguistic model and a context-specific linguistic model. As a result of the above recited drawbacks, current text processors might not take into account the unique linguistic aspects of specific contexts. Therefore there is a need for text processors that can account for the specific context in which a natural language processing system operates. According to various aspects described herein, a device generates a recognition result corresponding to natural language input received at the device. The device utilizes a context-free linguistic model and a context-specific linguistic model to process input text that corresponds to the natural language input received. Processed input text is generated, and the device performs semantic analysis of the processed input text using a natural language understanding model to generate a natural language understanding recognition result (referred to below as simply a recognition result). As one example, audio received through a microphone (e.g., human speech) is transformed into computer-usable recognition result.

A first aspect described herein provides a device for processing input received at the device. The device includes one or more processors and an input interface configured to receive input and generate a digital signal corresponding to the input, and memory storing instructions that are executable by one or more of the processors. When executed by one or more of the processors, the instructions obtain text based on the digital signal generated and process that text using a context-free linguistic model and a context-specific linguistic model to generate one or more linguistic processing results for the text.

A second aspect described herein provides a method for processing text corresponding to input received at a computing device. An input interface of the computing device receives the input and generates a digital signal corresponding to the input. Text corresponding to the input is generated, and the text is processed using a context-free linguistic model and a context-specific linguistic model to generate one or more linguistic processing results for the text. The linguistic processing results include, for example, one or more of a tokenization for a portion of the text, a normalization for a portion of the text, a sequence of normalizations for a portion of the text, and combinations thereof.

A third aspect described herein provides a non-transitory computer-readable medium having instructions stored thereon which are executable by a processor of a computing device. When executed by the processor of the computing device, the instructions cause the computing device to perform steps for generating a natural language understanding recognition result corresponding to speech input received at the computing device. An audio input interface of the computing device receives the speech input and generates a digital signal corresponding to the speech input. Text corresponding to the speech input is generated, and the text is processed using a context-free linguistic model and a context-specific linguistic model to generate one or more linguistic processing results for the processed text. The text and the corresponding linguistic processing results are then processed using a natural language understanding model to generate a natural language understanding recognition result. The natural language understanding recognition result comprises at least one intent and at least one mention corresponding to the text generated from the digital signal. The natural language understanding recognition result is then provided to a software application residing at the computing device.

According to additional aspects described herein, the context-free linguistic model includes linguistic information that is applicable to multiple contexts while the context-specific linguistic model includes linguistic information applicable to a specific context. Portions of the linguistic information of the context-specific linguistic model may be extracted from various knowledge sources, such as an ontology and a lexicon defined for the context. The linguistic information of the context-free linguistic model and the context-specific linguistic model may respectively derive from different knowledge sources. The context-free linguistic model and the context-specific linguistic model may be included in a singular composite linguistic model. A natural language understanding model may be trained using the text and its corresponding linguistic processing results and using annotations of the text.

The linguistic information of the context-specific and context-free linguistic model may also include transform rules that are configured to be applied to the text during processing. The transformation rules may control tokenization of portions of the text as well as normalization of portions of the text. Accordingly, the linguistic processing results generated for the text may include tokens for portions of the text, and a transform rule may control alteration of those tokens, e.g., splitting one of the tokens, or combining at least two of the tokens. A transform rule may also specify a normalization for at least a portion of the text, e.g., a canonical form for a portion of the text. A transform rule may specify a normalization for the text by adding a new normalization to the linguistic processing results. A transform rule may also remove an existing normalization from the linguistic processing results generated for the text.

The transform rules are used to ensure that all application components developed independently are aligned with one another by generating a representation of the data that can be digested by each of those components. This can be done by, among other means, associating a parsable normalization with a non-parsable normalization or by enforcing a common segmentations for tokens for all components. The context-specific linguistic model may also include configuration parameters that indicate whether various transform rules of the context-free linguistic model are enabled or disabled.

The alignment of the trained components is insured by training them on a single set of annotations that were presented to the annotator on a given form and then projecting those annotations on the form that the components require. The results of those independent components can then be retransferred on the shared representation in order to merge the results or allow other components to use them as input. This is made possible through an additive approach where normalizations are added on the segments as opposed to the most common approach of replacing the training sentences by their more likely normalization.

According to further aspects described herein, a context-specific linguistic model may be retrieved from a remote location if it is not currently stored at a data store of a computing device that has received natural language input for processing. A request for the context-specific linguistic model may be submitted to the remote location, and the context-specific linguistic model may be received from the remote location in response. The context-specific linguistic model received may then be stored at the data store of the computing device. The request may identify the context in which the natural language input is received which may include a particular domain of knowledge or a particular application residing at the computing device. The context-specific linguistic model may be loaded into a cache of the computing device. If the cache currently contains a context-specific linguistic model, that context-specific linguistic model may be deleted from the cache prior to loading another context-specific linguistic model into the cache.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
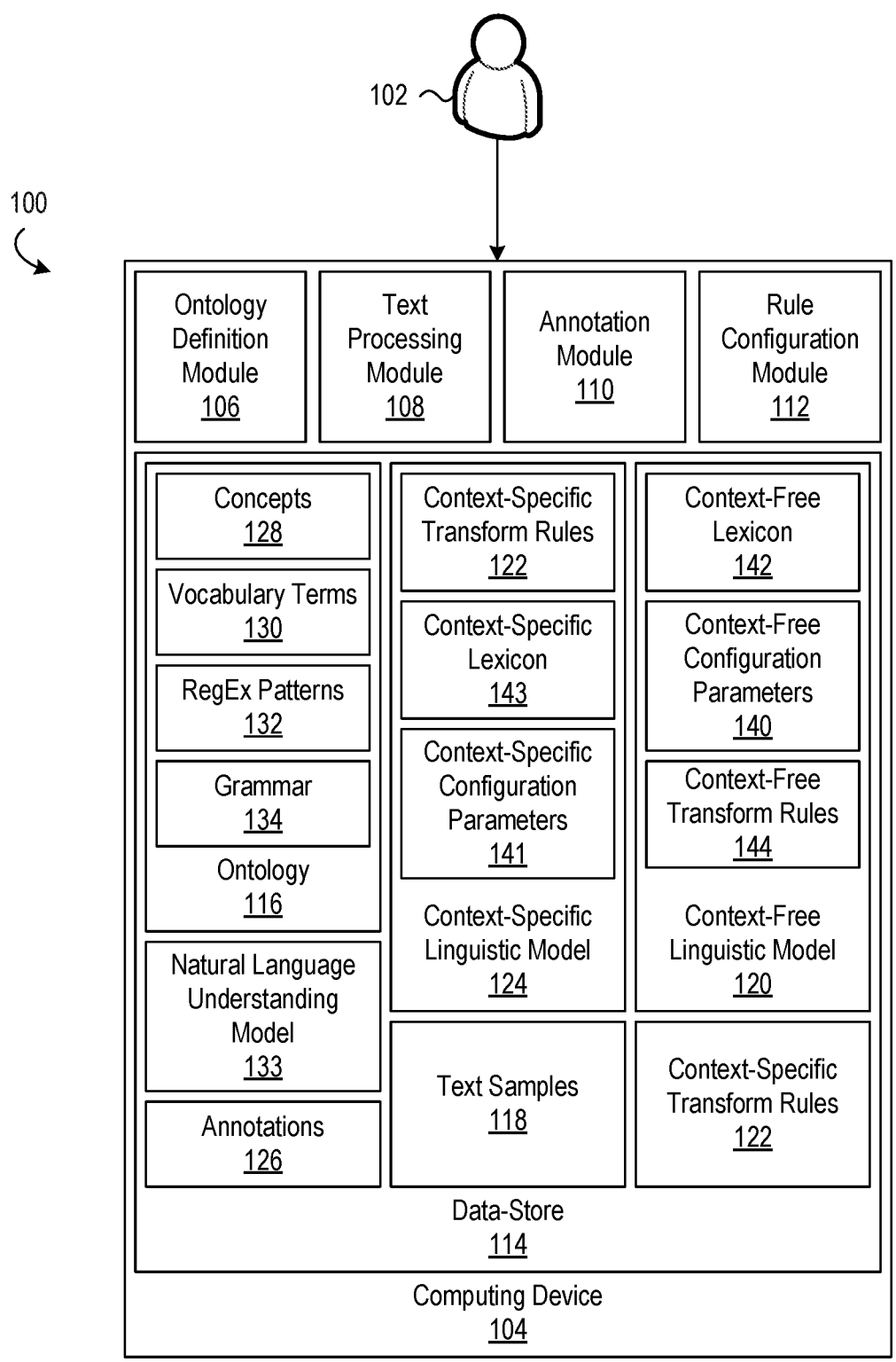
FIG. 1 depicts an example of an implementation of a system for developing a natural language processor adapted for context-specific processing of natural language input in accordance with various aspects described herein.

In the following description of the various implementations, reference is made to the accompanying drawings identified above and which form a part hereof, and in which is shown by way of illustration various implementations in which aspects described herein may be practiced. It is to be understood that other implementations may be utilized and structural and functional modifications may be made without departing from the scope described herein. Various aspects are capable of other implementations and of being practiced or being carried out in various different ways.

As a general introduction to the subject matter described in more detail below, aspects described herein are directed toward processing natural language text with each of a context-free linguistic model and a context-specific linguistic model in order to improve automated understanding of natural language input. Through transform rules, the context-specific linguistic model may be adapted or tuned for specific contexts such as a particular domain of knowledge, a particular software application or program configured to respond to natural language input, and other types of contexts that will be appreciated with the benefit of this disclosure.

As described in further detail below, an input interface of a computing device receives input (e.g., speech input) and generates a digital signal corresponding to that input. Text corresponding to the digital signal is obtained, and the text is processed using the context-free linguistic model and the context-specific linguistic model to generate one or more linguistic processing results for the text. The text and the linguistic processing results may then be processed using a natural language understanding model in order to generate a natural language understanding recognition result corresponding to the input received at the input interface. The text and the linguistic processing results may also be annotated and used to train a natural language understanding model. The linguistic processing results generated for the text may relate to, e.g., the tokenization of portions of the text, the normalization of portions of the text, and sequences of normalizations for portions of the text. The linguistic processing results generated for the text also may also relate to, e.g., prioritization of one linguistic processing result over another linguistic processing result as well as the rankings of multiple linguistic processing results. The linguistic processing results generated for the text may thus include, e.g., one or more tokens for portions of the text, one or more normalizations for portions of the processed text, and one or more sequences of normalizations for portions of the text. The linguistic processing results generated for the text may also include, e.g., priority values and rank values assigned to the tokens, normalizations, and sequences of normalizations.

The linguistic models include linguistic information for processing the text and generating the linguistic processing results. Linguistic information includes, for example, vocabulary terms that collectively provide a lexicon, transform rules for transforming portions of the text being processed, and configuration parameters. The context-free linguistic model includes linguistic information that is applicable to multiple contexts, and the context-specific linguistic model includes linguistic information that is applicable to a specific context, e.g., a specific application residing at a computing device.

The techniques described herein advantageously overcome shortcomings of linguistic processors that are developed without consideration of the context in which the processing will be performed. More particularly the techniques described herein provide an approach to take a linguistic processor that has been developed without regard to context and tune or adapt it for a particular context in which it will be used. These techniques provide a number of advantages to the development of natural language processors as well as the operation of natural language processors at runtime.

One advantage reduces the amount of storage necessary for a natural language processor that is deployed to handle natural language input for a variety of contexts. A natural language processor may utilize a context-free linguistic model for processing natural language input across multiple contexts (e.g., multiple applications) while using context-specific linguistic models for processing natural language input in a particular context. In this way, the natural language processor may advantageously share the context-free linguistic model across contexts while utilizing context-specific linguistic models as needed in a particular context. As described in further detail below, this configuration advantageously allows the natural language processor to retrieve and store context-specific linguistic models on demand as well as swap out context-specific linguistic models where storage capacities are limited. By utilizing context-specific linguistic models to process natural language input, the output of the subsequent semantic analysis is advantageously improved.

Another advantage improves the process of developing natural language processors, e.g., when generating linguistic rules, annotating text samples and training natural language understanding models and classifiers. Processing rules may be generated automatically; annotations may be automatically translated across representations to align data and annotations across the components of a natural language processor (e.g., grammars, tokenizers, normalizers, etc.) that may have diverging requirements on the data representation. Furthermore utilizing a context-specific linguistic model allows non-specialists to adapt the context-free linguistic model to the context in which the natural language processors will be used using a rule format. A natural language processor may thus be deployed with a template of a context-specific linguistic model that is subsequently configured with desired rules by the end user incrementally during the annotation process based on the sample currently observed.

For convenience, the following terminology is adopted in the present disclosure. A user interaction refers to an action taken by a user at a computing device and includes actions taken by a user at an application executing at the computing device. A user interaction may trigger some response by the computing device or application. User input refers to natural language input provided by a user and includes natural language speech provided by the user and natural language text. The natural language speech may be spoken by the user and received at an audio input device of a computing device. The natural language text may be entered by the user at a text input device of the computing device. The natural language text may also be generated from natural language speech provided by the user, e.g., using an automatic speech recognizer. An intent refers to the goal the user seeks to achieve through the user interaction.

An ontology refers to a structured collection of information that describes a particular context. A context, as used herein, includes a particular domain of knowledge (e.g., botany) as well as a particular system or application (e.g., a flight booking system/application). A concept refers to information relevant to a particular context and intent that is expected to be provided in user input received (e.g., with respect to a botany context, taxonomy, species, leaf morphology, and the like). The elements of an ontology may include the intents, concepts, vocabulary terms, grammars, and patterns (e.g., regular expressions). The ontology may also define relationships between the elements it defines. The broader term knowledge source can be used to refer to an ontology. Other types of knowledge sources can be, but not limited to, lexicon, corpus, language model and manually written rules.

A text sample refers to a collected user input that is to be annotated during the development of a natural language processor. A text sample may be a sentence, a portion of a sentence, or multiple sentences. A substring refers to a portion of a text sample. The NLU output and annotations can be seen as additional information added to the tokens. A set of text samples refers to a collection of one or more text samples. A training set of text samples refers to a set of annotated text samples used to generate a data-driven model of a natural language processor. A test set of text samples refers to a set of annotated text samples used to evaluate the accuracy of the natural language processor.

A segment refers to a meaningful substring of a text sample (e.g., a word) separated from other substrings (e.g., other words) that can't be divided any further and stay meaningful for the natural language understanding processor. "Pay $12," may be segmented into the following segments, ["Pay," "$," "12"]. A token is an element associated with a segment which might or might not contains additional information such as normalizations, part of speech. Accordingly, tokenized form and segmented form refer to a text sample that is represented as its sequence of tokens or segments, which may be separated by a boundary character (e.g., a space character).

A mention refers to the occurrence of a concept in a sample. The mention literal refers to the segments of the text sample corresponding to the tokens covered by the mention. As an example, in the following text sample, "*Coriandrum sativum*, commonly known as cilantro, exhibits pinnatifid leaves," includes three mentions, binomial name, common name, and leaf shape. The respective literals for the mentions, in this example, are "*Coriandrum sativum*," "cilantro," and "pinnatifid." A text sample may be labeled with mention tags that indicate the mentions and their corresponding literals. The text sample above, for example, may be labeled as follows to identify the mentions and their corresponding literals, "[BINOMIAL_NAME]*Coriandrum sativum*[/], binomially known as [COMMON_NAME]cilantro[/], exhibits [LEAF_SHAPE]pinnatifid[/] leaves."

A normalization refers to alternative representations of a subsequence of tokens of a text sample that each respectively conform to some standard. As an example, normalizations of the airport code for the airport code, YUL, include "YUL," "Y.U.L.," "yul," and "y.u.l." A lattice refers to a connected graph representing a text sample wherein the nodes of the graph represent the tokens and/or segments of the text sample.

Accordingly, normalized form refers to a single sequence of possible normalization covering each of the tokens with no overlap. It will be recognized that text samples may be associated with multiple potential normalized forms where one or more tokens of the text sample are associated with one or more normalizations. Using the example above, potential normalized forms of the text sample include, "Book a flight from Montreal Airport," and "Book a flight from YUL." The top or best normalized form refers to a preferred normalized form for a text sample. An n-best normalization refers to a set of n potential normalizations for a text sample, e.g., multiple paths through the lattice generated for the text sample. The n-best normalization may be sorted by order of preference.

A canonical form refers to the semantic meaning of the literal of a mention. Each normalization for the literal of a mention may be associated with the same canonical form. As an example, the canonical form for the various normalizations of "[AIRPORT]Montréal[/]" may be "{Code: YUL, City: Montréal}." Canonicalization thus refers to selecting or assigning the canonical form for a literal or a normalization of that literal. In addition, a parsable string refers to string for which the canonical form may be determined for a specific concept. As such a parsable normalization is a normalization for which the canonical form may be determined for a specific concept. As such a parsable mention is a mention for which the canonical form may be determined based on some representation of its token.

An annotation refers to metadata associated with a text sample that indicates the output that we which to obtain for that text sample for a given process Annotations may include natural language processing annotations and natural language understanding annotations. A natural language processing annotation includes the tokenization and normalizations for a text sample or a portion of the text sample. A natural language understanding annotation includes the intent, mention, and canonical form for a text sample or a portion of the text sample.

A natural language processor may interact with a computing device and application in a variety of ways. The natural language processor may be implemented as a module of an application and thus packaged and deployed with that application. The natural language processor may also be implemented as a stand-alone application that resides at a computing device with an application and invoked by that application as needed. The natural language processor may also be implemented as service that is accessible by the computing device or application. A natural language processing service may be located locally or remotely relative to the computing device or application. Accordingly a computing device and application may access a remotely located natural language processing service via a network.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

Referring now to FIG. 1, a system 100 for developing a natural language processor adapted for context-specific processing of natural language input is shown. A developer 102 may interact with a computing device 104 to, e.g., define an ontology for the particular context, configure processing rules, and annotate text samples, and train the natural language understanding models and classifiers.

The computing device 104 is a special-purpose computing device programmed to perform functionality associated with defining an ontology for a particular context, processing text samples, annotating the text samples, and configuring processing rules. Accordingly the computing device 104, in this example, includes an ontology definition module 106, a text processing module 108, an annotation module 110, and a rule configuration module 112. The modules 106-112 may be implemented as independent applications or programs at the computing device 104 or as components (e.g., respective sets of instructions) of a single software application. Other configurations and arrangements of the modules 106-112 may be selectively employed, e.g., one or more of the modules may be located on individual computing devices that are in signal communication with each other via an internal or external network.

The computing device 104, in this example, also includes a data store 114 containing various types of data utilized in the development of a natural language processor and context-specific linguistic model. The data stored at the data store 114, in this example, contains an ontology 116, a set of text samples 118 for annotation and training, and a context-free linguistic model 120. The context-free linguistic model 120 includes a context-free lexicon 142 and may include context-free configuration parameters 140 controlling various aspects of processing as well as context-free transform rules 144 that are applicable to more than one context. During the development process, context-specific transform rules 122 for a specific context may be generated (e.g., automatically or in response to input received from the developer 102) and stored at the data store 114. As described in further detail below, the context-specific transform rules 122 may correspond to unique aspects of a particular context. The context-specific transform rules 122 may be added to the context-free linguistic model 120 to generate a context-specific linguistic model 124, which may also include a context-specific lexicon 143 and context-specific configuration parameters 141, all specific to a context and which may also be stored at the data store 114 once generated. The data store 114 may also contain a set of annotations 126 for the set of text samples 118.

The developer 102 may utilize the ontology definition module 106 to define the ontology 116. The ontology 116, in this example, includes concepts 128, vocabulary terms 130, regular expression ("regex") patterns 132, and a grammar 134. The concepts 128 (which may reference the grammars and regex patterns), vocabulary terms 130, regex patterns 132, and grammar 134 may collectively be referred to as linguistic information. A set of vocabulary terms may be referred to as a lexicon. The developer may thus specify, via the ontology definition module 106, the linguistic information for a particular context. The ontology definition module 106 is also configured to automatically traverse the ontology 116 to extract the linguistic information and generate the transform rules 122 added to the context-free linguistic model 120 in order to create the context-specific linguistic model 124.

The transform rules 122 may include two classes of transform rules. One class of transform rules may control the tokenization of text input into tokens, while the other changes the normalization of the tokens.

An example of this first class of transformation rule includes separating suffix and compound, e.g., splitting the token "anti-austerity" to the tokens "anti" and "austerity." Another example of this first class of transformation rule also includes merging tokens or a combination of both. e.g., transforming the tokens "anti" and "virus" to the token "antivirus." Those rules don't necessarily have to be applied on a tokenization but can also directly associate a tokenization to a substring of the input sentence, for example to ensure that words fitting a particular pattern relevant to the domain or customer will still fit the defined pattern. As an example, a context-specific linguistic model may be configured for an inventory management system/application, and the product model number might follow a pattern such as "PX" followed by a number, e.g. "PX2240". It is likely that a context free model would take the decision of splitting such words as PX+[NUMBER] e.g "PX", "2240." A transformation rule of this class of transform rules may ensure that the product model numbers, in this example, are kept as a singular unit. The rules might be restricted by adding sentence context information such as expected words to the left and/or right.

The main advantage of having a common tokenization of the input sentence across the various component part of the natural language understanding processor is that it insures that the generated results of those independent components can be combined or used by other components of the processor. The transform rules that control the tokenization can be used to ensure that this common tokenization will be adapted to the need of each component. This can be done by gathering information from each of the knowledge source used by each of the component and generating the transform rules from that information.

The second class of transform rules acts on the normalizations associated with a subset of tokens of the samples by adding, removing or ordering normalizations.

The more common usage of this type of transform rules is to add normalization to tokens. An example of usage of transform rules adding normalization could be to add a normalization conforming to a standard understood by one or more components of the natural language understanding processor, e.g. adding "(555) 123-1234" and "1-555-123-1234" to "555.123.1234." Another usage could be to associate equivalent form in different modality such as speech and text e.g. adding "one hundred one" and "one oh one" to "101". Other commons usage are to fix common typo, e.g associating "anti-virus" to "antivirus", associate tokens to simplified semantic representation (lemma, synonym), e.g. adding the normalization "TALK" to all tokens derived from the verb "talk" ("talking, talked, talks . . . ). It can also be used to generate normalization that split or merge tokens in order to map an alternate tokenization to the common one in the few cases where there's a conflict in the expected tokenization across component.

Adding normalization is useful to provide the representations that can be understood by each component of the natural language understanding processor even if the developer of those components never agreed on a representation. For example you might include in your natural language understanding processor a mention detector that understands phone number as "(555) 123-1234" and another canonicalization component expecting the phone number as "555.123.1234". By adding both normalization to the set of tokens ["555", "123", "1234"] of the sample "call 555 123 1234", the mention detector will be able to detect the position of the phone number and associate it to the three tokens using the normalization "(555) 123-1234" and the second component will be able to identify the proper canonicalization by looking at the detected mention and using the normalization that it understand for the concept and tokens of the mention.

The transform rules can also be used to remove normalization if they could potentially cause error or if a better one exists. For example, the tokens "101" could be associated with both "one hundred and one" and "one oh one". The second one might be somewhat ambiguous as it could mean "101" or "1 0 1" so if there's no explicit need from it from one of the component it might be removed. It also allow for simpler transform rules as you don't have to define the specific context in which the normalization happen as you can generate several normalization based on simple rule and then prune the more generic one. For example, "one oh one" could be generated from a simple digit mapping (1 to one. 2 to two . . . ) without considering if it fit a more specific pattern e.g. "one hundred and one" and then having a simple pruning rules that remove the less specific rules if there was a more specific one triggered. The ordering is similar at the exception that it doesn't remove the normalization but indicate that it should be given less or more value than another one. For example, our example with "101" could also applied to "911" at the exception than in this particular case we might want to keep "nine one one" as it might be useful if it's a phone number but "nine hundred and eleven" would still be preferred in most cases. This can be particularly useful when combined with supplemental linguistic information for the current human-machine turn.

The text processing module 108 is configured to apply the context-specific linguistic model 124 to the text samples 118. The text processing module 108 may also apply the context-specific linguistic model 124 to the annotations 126 generated from the text samples 118. Applying the context-specific linguistic model 124 may include applying one or more of the transform rules 122 to input text or annotated input text. As described in further detail below, the developer 102 may iteratively modify the context-specific linguistic model 124 to the text samples 118 and/or annotations 126 during the development of a natural language processor.

The annotation module 110, in this example, is configured to facilitate the annotation of the text samples 118. Accordingly the annotation module 110 is configured to present, at a display device of the computing device 104, one or more of the text samples 118 and receive, via an input device of the computing device, user input corresponding to an annotation of the text samples presented. Annotating a text sample 118 through the annotation module 110 consist in providing the expected output for the given sample.

The developer 102 may iterate through the text samples 118 presented via the annotation module 110 to generate respective annotations 126 for the text samples. In addition to adding the expected results for each trained component, the developer 102 may modify the context-specific linguistic model by modifying the tokenization and/or normalization of the sample which will trigger the generation of transform rules by the rule configuration module 112, or by defining a rule to be added to the context-specific linguistic model 124.

The developer 102 can also through the rule configuration module 112 parametrize the context-free linguistic model. Parametrization can include enabling or disabling specific sets of rules of the context-free linguistic model (e.g. disabling standard unit and enabling physical ones so 'g' would have the normalization 'gravity' and not 'grams'), to enable or disable specific algorithms of the text processing module 108 (e.g., enable generic decompounding of unknown word) or set parameters controlling the behavior of one or more algorithms (e.g., limiting the number of compound forms that a word can be divided into by the generic decompounding algorithm).

The developer 102 may thus initiate a training process to train a natural language understanding model 133. The natural language understanding model 133 may be trained using a subset of the annotations 126, the context-free linguistic model 120, and the context-specific linguistic model 124 including the transform rules 122. A training data set may thus include text samples, respective tokenizations of those text samples, and the respective normalizations of the tokens of text samples. The text samples included in the training data set may include the text samples 118 used to produce the subset of annotations 126 of the training set.

The training of the natural language understanding model 133 might require the training of several components which might be completely independent or built upon results of other data or rule-driven components. Each of the components is trained on the exact same set of annotations 126 and extracts the information it needs by projecting the annotations on one or many forms of the sample (i.e., the component can extract information from any combination of normalized, tokenized and original forms in addition or other forms or output generated by one or more prior components of the natural language understanding model 133). Having been trained, the natural language understanding model 133 may be incorporated into a natural language processor, and tested using the annotations 126 and text samples 118 that weren't used for training.

Various quality metrics known to those skilled in the art may thus be assessed with respect to the set of natural language understanding results. If the developer 102 is not satisfied with the results of the natural language understanding output, then the developer may obtain and annotate additional text samples, regenerate the context-specific linguistic model 124, retrain the natural language understanding model 133, and repeat the natural language understanding tests. Otherwise the developer may package the natural language understanding model 133, the context-free linguistic model 120, and the context-specific linguistic model 124 (including the transform rules 122 and the context-specific lexicon 143) in a natural language processor and deploy the natural language processor, e.g., to an end-user device or a server that facilitates natural language processing for remotely located end-user devices via a network.

Figure 2:
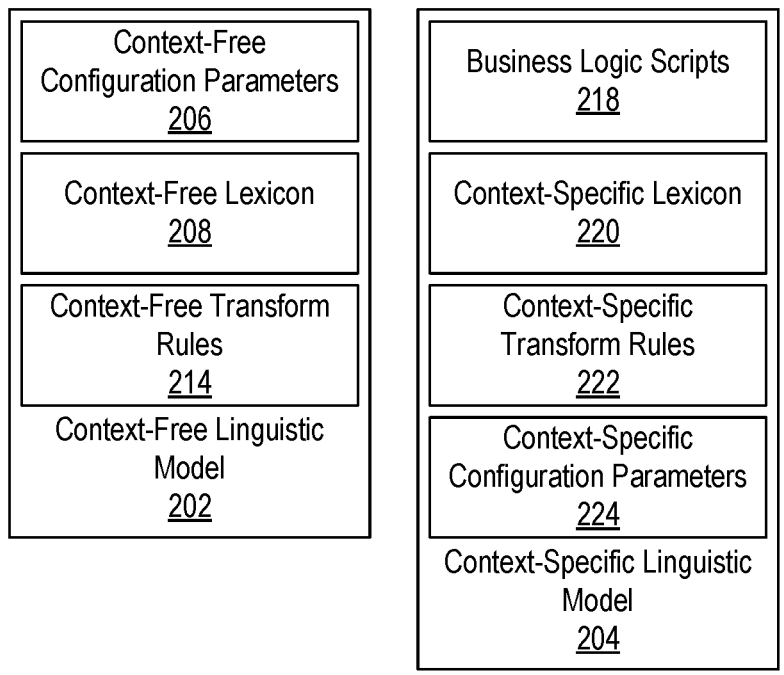
FIG. 2 depicts respective examples of implementations of a context-free linguistic model and a context-specific linguistic model in accordance with various aspects described herein.

Referring now to FIG. 2, respective examples of a context-free linguistic model 202 and a context-specific linguistic model 204 are shown. As noted above, the context-free linguistic model 202 is suitable to process input text across a variety of contexts, e.g., across domains, across applications, and the like. As the context-free linguistic model 202 may be generally utilized in a variety of context, it may also be referred to as a general linguistic model. The context-specific linguistic model 204, however, is suitable to process text in only one context. It should be appreciated, however, that the context-specific linguistic model 204 should not be interpreted as strictly limited to only one context as there may be situations in which the context-specific linguistic model 204 may be suitable to process input text received in a few related contexts such as, for example, a set of productivity software applications related as a suite of office software applications (e.g., a suite including a word processor application, a spreadsheet application, and a presentation application).

Splitting the text processing models into a context-free linguistic model 202 and a context-specific linguistic model advantageously allows sharing and reuse of the context-free linguistic model 202 across contexts thus optimizing, e.g., storage space and resource consumption. As an example, two software applications residing at an end-user device may each be configured with a natural language processor. The context-free linguistic model 202 may be stored at a shared memory location at the end-user device and thus accessible to each respective natural language processor of the two software applications. This configuration advantageously minimizes the storage space utilized at the end-user device.

The context-free linguistic model 202, in this example, includes a variety of elements for processing input text. As seen in FIG. 2, the context-free linguistic model 202 includes a set of context-free configuration parameters 206, a context-free lexicon 208, context-free transform rules 214. The context-free configuration parameters 206 may include parameters for a base text processing model of the natural language processor such as enabling the decompounding of unknown word into known words from the lexicons 208 and 220.

The context-specific linguistic model 204, in this example, likewise includes a variety of elements for processing input text. As also seen in FIG. 2, the context-specific linguistic model 204 includes a set of business logic scripts 218, a context-specific lexicon 220, context-specific configuration parameters 224 that may that may override general parameters, and context-specific transform rules 222. The context-specific configuration parameters 224, in addition of overriding general parameters, can also enable or disable one or more of the context-free transform rules 214 of the context-free linguistic model 202.

Figure 3:
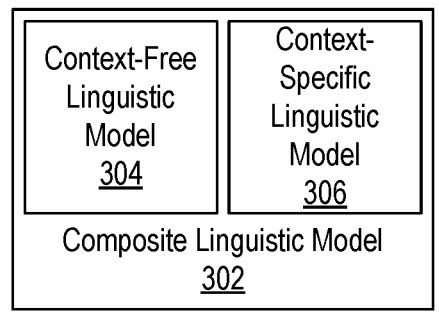
FIG. 3 depicts an example of an implementation of a composite linguistic model in accordance with various aspects described herein.

In some example implementations, a natural language processor may combine a context-free linguistic model and a context-specific linguistic model into a singular linguistic model. FIG. 3 depicts a composite linguistic model 302 that includes both a context-free linguistic model 304 and a context-specific linguistic model 306.

Figure 4:
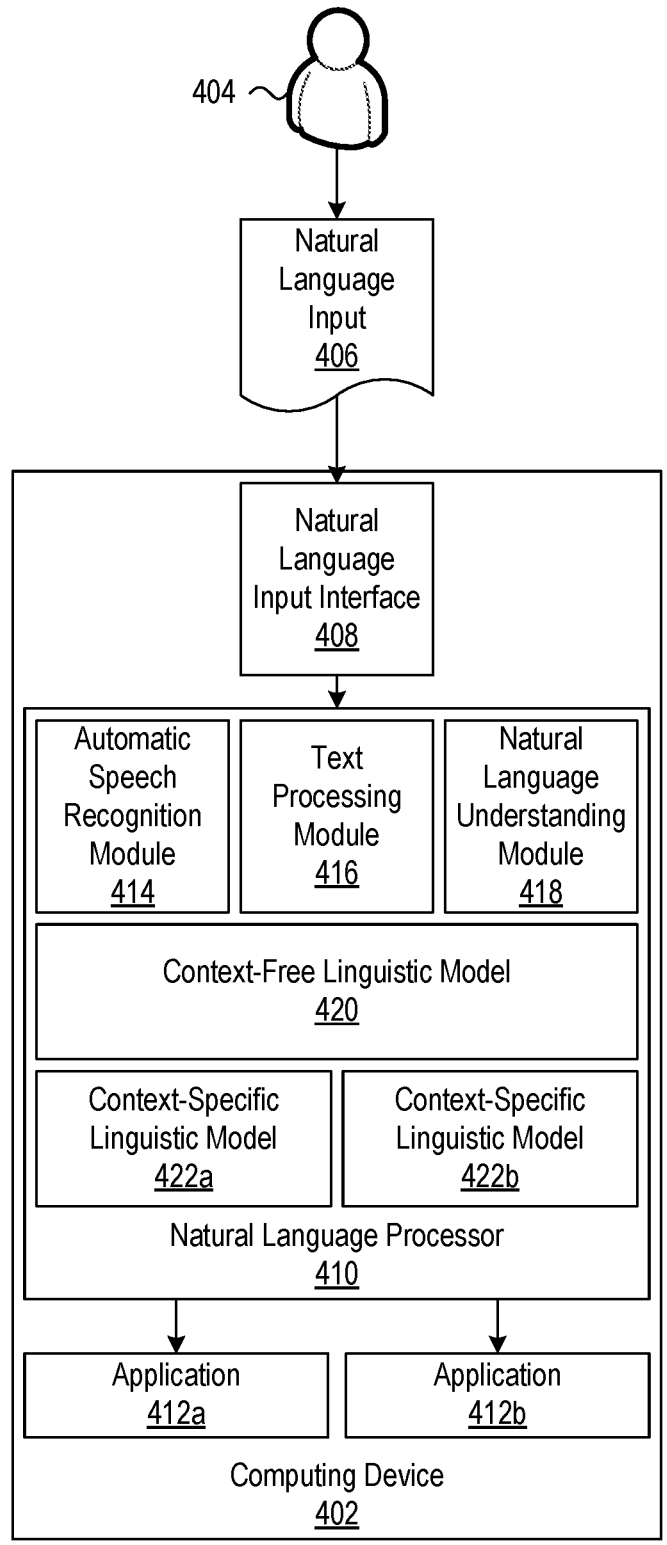
FIG. 4 depicts an example of an implementation of an end-user computing device configured for natural language processing in accordance with various aspects described herein.

Referring now to FIG. 4, an example of an implementation of an end-user computing device 402 configured for natural language processing is shown. A user 404 may provide natural language input 406 to the computing device 402 via a natural language input interface 408 of the computing device. The computing device 402 may be any computing device suitable for receiving natural language input such as, for example, a desktop computing device, laptop computing device, tablet computing device, palmtop computing device, cellular telephone (e.g., a smartphone or feature phone), video game machine, television, set-top box, and other types of computing devices configured to receive natural language input and process that natural language input at a natural language processor.

The natural language input 406 may be any form of natural language including speech, typed text, handwritten text, and manual gestures. Accordingly, where the natural language input 406 is speech, the natural language input interface 408 may be a speech input interface that includes a microphone that generates an analog signal corresponding to the speech input received from a user and an analog-to-digital converter that converts the analog signal to a digital signal corresponding to the speech input. Where the natural language input 406 is typed text, the natural language input interface 408 may be a text input interface such as a physical keypad or keyboard, a touchscreen displaying a virtual keypad or keyboard, and other types of input means that allow selection of individual characters or words and generates a digital signal corresponding to those characters or words. Where the natural language input 406 is handwritten input, the natural language input interface 408 may include a touchscreen that receives strokes of a finger, stylus, or digital pen and an interpreter that converts those strokes into a digital signal representing individual characters or words. Where the typed input or handwritten input is applied to a physical document, the natural language input interface 408 may include an image input device (such as a camera or scanner) that generates a digital image of the document and an interpreter that utilizes optical character recognition (OCR) technology to recognize individual characters or words in the digital image. Where the natural language is a signed language, the user 404 may provide the natural language input as manual gestures. Where the natural language input 406 includes manual gestures, the natural language input interface 408 may include an image input device (such as a camera) that generates digital images of the gestures and an interpreter that processes the digital images of the gestures to recognize individual characters or words. Although the computing device 402 shown in FIG. 4 includes a single natural language input interface 408, it will be appreciated that other implementations may employ multiple natural language input interfaces configured to receive different types of natural language input. As an example, a computing device may include three natural language input interfaces each respectively configured to receive natural language input as speech, typed text, and handwritten text.

The natural language input interface 408, in this example, is in signal communication with a natural language processor 410. Where a computing device includes multiple natural language input interfaces, a natural language input processor may be in signal communication with one or more of those natural language input interfaces. The natural language processor 410 may, in turn, be in signal communication with one or more applications residing at the computing device 402 such as, e.g., applications 412a and 412b as shown by way of example in FIG. 4. The natural language processor 410 may reside at the computing device 402 as, e.g., an independent software application or a module (e.g., an add-on, plug-in, or extension) of an application residing at the computing device. The natural language processor 410 may be configured to process natural language input intended for only one application residing at the computing device 402, or may be configured to process natural language input respectively intended for multiple applications residing at the computing device. The computing device 402 may also include multiple natural language processors that are the same as or similar to the natural language processor 410 shown in FIG. 4. Additional and alternative configurations and arrangements of the natural language processor 410 at the computing device 402 will be appreciated with the benefit of this disclosure.

The natural language processor 410, in this example, includes an automatic speech recognition module 414, a text processing module 416, a natural language understanding module 418, a context-free linguistic model 420, and two context-specific linguistic models 422a and 422b, one for each unique application 412b and 412b. Although not shown in FIG. 4, the natural language understanding module 418 may include a natural language understanding model.

The automatic speech recognition module 414, in this example, is configured to generate input text when the natural language input 406 is received at the natural language input interface 408 as input speech. The natural language input interface 408 may include a microphone and an analog-to-digital converter, receive the input speech at the microphone, and generate a digital signal corresponding to the input speech using the analog-to-digital converter. The automatic speech recognition module 414 may receive and process the digital signal to generate input text that corresponds to the digital signal. Having generated input text from the natural language input 406, the automatic speech recognition module 414 may provide the input text to the text processing module 416 for processing. Where the natural language input 406 is initially received at the computing device 402 as input text, the natural language input interface 408 may provide the input text to the text processing module 416.

Upon receipt of the input text, the text processing module 416 may process the input text using the context-free linguistic model 420 and the context-specific linguistic model 422 as described above. The text processing module 416 may provide the processed input text generated to the natural language understanding module 418 for semantic (natural language understanding) analysis.

As described above, the natural language understanding module 418 may identify the semantic information in the processed input text during the semantic analysis. Having generated a natural language understanding output for the natural language input 406, the natural language understanding module 418 may provide the semantic output to an application, e.g., application 412a or 412b. The application may thus respond to receipt of the recognition output, e.g., by invoking some functionality the application is configured to perform.

FIG. 4 depicts two context-specific linguistic models 422a and 422b at the computing device. As noted above, however, a computing device may include more than two context-specific linguistic models to process natural language input respectively received in multiple contexts.

Figure 5:
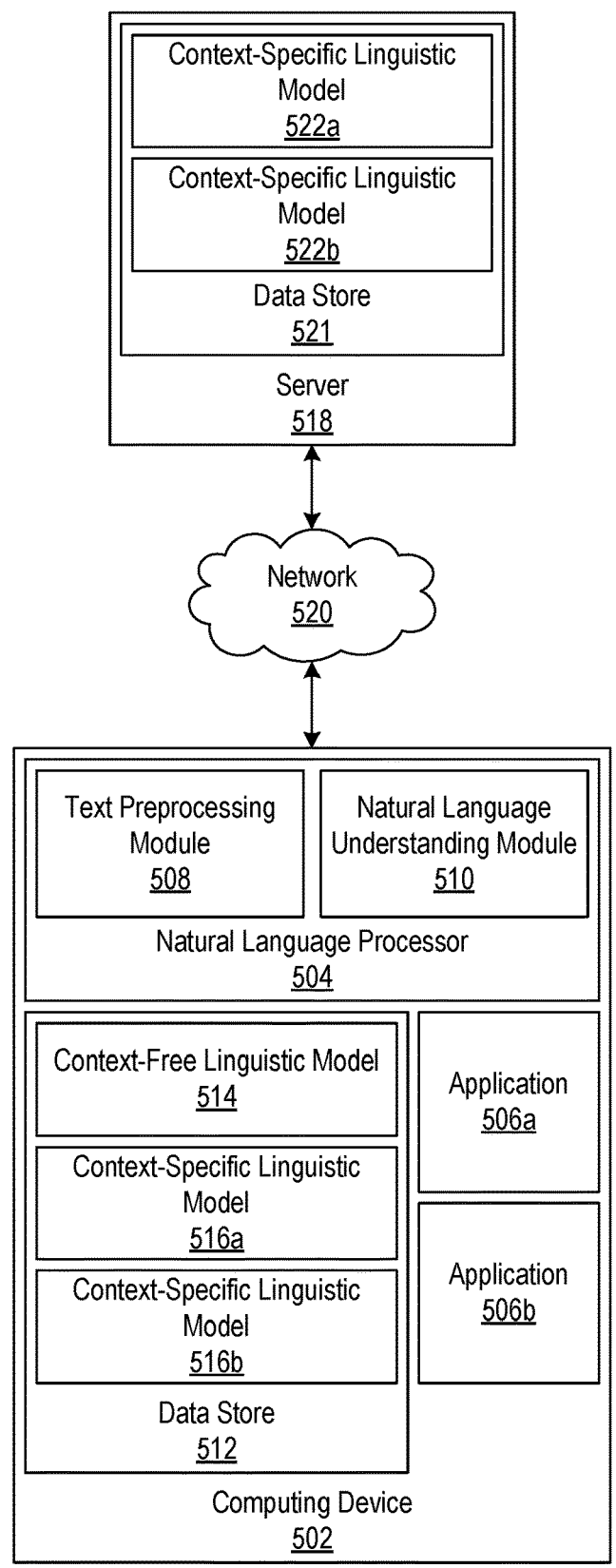
FIG. 5 an example of an implementation of a natural language processing system in accordance with various aspects described herein.

Referring to FIG. 5, a natural language processing system 500 is shown. FIG. 5 also depicts another example of an implementation of an end-user computing device 502 configured for natural language processing. The end-user computing device 502, in this example, likewise includes a natural language processor 504 in signal communication with a set of applications 506a and 506b residing at the computing device (though in some implementations, the applications may reside at a remotely located computing device such as an application server). As seen in FIG. 5, the natural language processor 504, in this example, similarly includes a text processing module 508 and a natural language understanding module 510 for processing natural language input and generating corresponding natural language understanding results. The text processing module 508 and the natural language understanding module 510 may be the same as, or at least similar to the text processing module 416 and the natural language understanding module 418 respectively described above with reference to FIG. 4.

As also seen in FIG. 5, a data store 512 of the computing device 502 stores a context-free linguistic model 514 (in some implementations several context-free linguistic models may be stored in the data store) and multiple context-specific linguistic models 516a and 516b. The data store 512 may include both persistent and volatile memory for storing the models 514 and 516a-b. In this way, the natural language processor 504 may cache a context-free linguistic model and a context-specific linguistic model during natural language processing. The data store 512 may include separate caches for the context-free linguistic model 514 and the context-specific linguistic models 516a and 516b. The natural language processor 504 may cache the models 514 and 516a-b as part of an initial start-up operation or on-demand.

More particularly, the natural language processor 504 may identify the context in which natural language input is to be received and cache the context-specific linguistic model corresponding to that context at the data store. The natural language processor 504 may automatically identify the context in which natural language input is to be received, e.g., based on which application currently has focus at the computing device 502. As an example, the natural language processor 504 may determine the identity of the currently-focused application, and cache the context-specific linguistic model associated with that application at the data store 512. The natural language processor 504 may also identify the context in which natural language input is to be received in response to receipt of user input. As another example, a user may select or otherwise specify a particular domain the natural language input is associated with (e.g., botany), and the natural language processor 504 may cache the context-specific linguistic model associated with that domain (e.g., a botany-specific linguistic model) at the data store 512.

In some situations, the amount of storage available at the data store 512 of the computing device 502 may be limited. In these situations, the natural language processor 504 may swap out the context-specific linguistic models cached at the data store 512 as needed in order to process natural language text for a particular context, e.g., delete from the cache a context-specific linguistic model currently stored at the cache. Accordingly the natural language processor 504 may determine whether a chosen context-specific linguistic model is available at the data store 512. If the chosen context-specific linguistic model is available in permanent disk storage at the data store 512, then the natural language processor 504 may load the chosen context-specific linguistic model into a cache of the data store. If the chosen context-specific linguistic model is not available at the data store 512, however, then the natural language processor 504 may retrieve it, e.g., from another computing device.

As also shown by way of example in FIG. 5, the system 500 includes a server 518 located remotely relative to the computing device 502 and in signal communication with the computing device via a network 520. The network 520 may be a wired network, a wireless network, or include a combination of wired and wireless networks. The network 520 may also include one or more of a local area network (LAN), a wide area network (WAN) such as the Internet, and a cellular network. Accordingly the computing device 502 and the server 518 may exchange communications according to one or more suitable network protocols, e.g., HTTP.

The server 518 may likewise include a data store 521 that stores one or more context-specific linguistic models such as context-specific linguistic model 522a and 522b. Although only two context-specific linguistic models 522a-b are shown in FIG. 5, the data store 521 of the server 518 may include many more context-specific linguistic models that have been developed for various contexts. The server 518 may thus be in signal communication via the network 520 with multiple computing devices configured for natural language processing. The server 518 may thus act as a repository and distributor of context-specific linguistic models.

In response to determining that a chosen context-specific linguistic model is not available at the data store 512 of the computing device 502, the natural language processor 504 may submit a request (e.g., an HTTP request) to the server 518 for the chosen context-specific linguistic model. The request may identify the chosen context-specific linguistic model, e.g., include a unique identifier for the context-specific linguistic model. In response to receipt of the request from the natural language processor 504, the server 518 may retrieve the requested context-specific linguistic model and transmit it back to the computing device 502 via the network 520 (e.g., in an HTTP response). The computing device 502 may store the context-specific linguistic model received at the data store 512. The natural language processor 504 may then cache the requested context-specific linguistic model at a cache of the data store 512 such that it is available for processing natural language input for that context. If the cache is full, then the natural language processor 504 may evict or otherwise discard a cached context-specific linguistic model in favor of the requested context-specific linguistic model retrieved (e.g., downloaded from the server 518). The natural language processor 504 may employ a least-recently-used strategy to determine which cached context-specific linguistic model to evict from the cache if the cache includes multiple cached context-specific linguistic models. The natural language processor 504 may be configured to similarly cache a composite linguistic model at the data store 512 and similarly swap out the current context-specific linguistic model packaged or otherwise bundled with the composite linguistic model.

In some implementations, the text processing module may reside at a remotely located computing device such as a natural language processing server. A natural language processor residing at an end-user computing device, in this example implementation, may facilitate natural language processing of natural language input received at the computing device using the natural language processing server. In this regard, the natural language processor may issue a request (e.g., an HTTP request) to the natural language processing server for processing input text received via a natural language input interface at the computing device. The request sent to the natural language processing server may include the input text and identify the context-specific linguistic model to use for the text processing procedure. A text processing module residing at the natural language processing server may retrieve the context-specific linguistic model identified and generate processed input text for subsequent semantic analysis. The natural language processing server may similarly include a natural language understanding module that performs the semantic analysis to generate a natural language understanding result as described above. The natural language processing server may then transmit the natural language understanding result (e.g., in an HTTP response) back to the natural language processor at the computing device. The natural language processor may then forward the natural language understanding result received to an application residing at the computing device. In other example implementations, the natural language processor may include the natural language understanding module and thus perform the semantic analysis locally at the computing device. The natural language processing server, in this alternative example implementation, may thus transmit the processed input text (e.g., in an HTTP response) back to the natural language processor at the computing device.

While not shown in the figure, some implementations may store the natural language understanding modules on a server 518 located remotely relative to the computing device 502 and in signal communication with the computing device via a network 520. In response to determining that an application 506*a* and 506*b* require a specific natural language understanding model, the natural language processor 504 may submit a request (e.g., an HTTP request) to the server 518 for the chosen natural language understanding model. The context-specific linguistic model could have been packaged inside the natural language understanding model. In this implementation, the text processing module 508 will retrieve the required context-specific model from the natural language understanding module 510 as it would have from the server 518 directly in other implementations.

While not shown in the figure, some implementations may permit natural language input to be accompanied by supplemental linguistic information, perhaps associated with the dialog state of the application, or information specific to the current user. For example, the user's contact list, additional configuration parameters, additional transform rules, or other. If provided the additional information is combined with the context-free linguistic model and the context-specific model (as an overlay) for the duration of that human-machine turn. This advantageously provides improved text processing where the natural language processing may also be specialized for the particular human machine turn. The supplemental linguistic information may be included in an additional context-specific normalization model used to process the text and generate linguistic processing results for the text. In other words, multiple context-specific linguistic models may be employed to process the text and generate linguistic processing results. In such situations, one of the context-specific linguistic models may be associated with a particular context and another context-specific linguistic model may be associated with a sub-context of that context. As an example, a context-specific linguistic model may be associated with a particular application residing at a computing device, and an additional context-specific linguistic model may be associated with the user currently interacting with that application. In this example, the current user may be understood as a sub-context of the application context. The linguistic information included in the context-specific linguistic model associated with the sub-context, in this example, may include linguistic information associated with the current user such as, for example, a contact list of that user. A different sub-context for the application context may exist when a different user interacts with the application. As another example, a particular application state (e.g., display of a particular application dialog) may also be understood as a sub-context of the application context for which another context-specific linguistic model may be employed to generate linguistic processing results. Additional examples will be appreciated with the benefit of this disclosure. Additional context-specific linguistic models may be employed at runtime.

The natural language processing server may include a load-balancing agent, and the remote text processing module may register with the load-balancing agent for distributed processing on input text received from one or more remotely located end-user computing devices. Multiple text processing modules may be deployed in a cluster configuration and/or a master/slave configuration. The loading of context-specific linguistic models may be synchronized among the members of the cluster. The context-free linguistic model, which may consume a relatively high percentage of resources, may be loaded on demand into a shared memory location that is accessible to each member of the cluster, and released from shared memory when no active context-specific model makes reference to it.

The request to process input text may specify one unit of input text to process (e.g., one sentence) or multiple units of input text to process as a batch job (e.g., multiple sentences). The text processing module may, in some example implementations, process multiple units of input text asynchronously but sequentially. The text processing module may employ an asynchronous waterfall dispatch strategy to batch process multiple units of input text. More particularly, the text processing module may perform a prefix routine (e.g., a sequence of initial processing steps) prior to a tokenization process. The text processing module may then perform an infix routine that may include one or more of tokenization steps, formatting steps, normalizations steps, and the like. The text processing module may then perform a postfix routine (e.g., post-processing steps) on the results generated by the infix routine and accumulate the result generated by the postfix routine with other results generated in response to the request. In some example implementations, the prefix routines and the postfix routines may be omitted. In some example implementations, prefix and postfix routines may leverage additional text processing routines that have been coded into business logic scripts.

Figure 6:
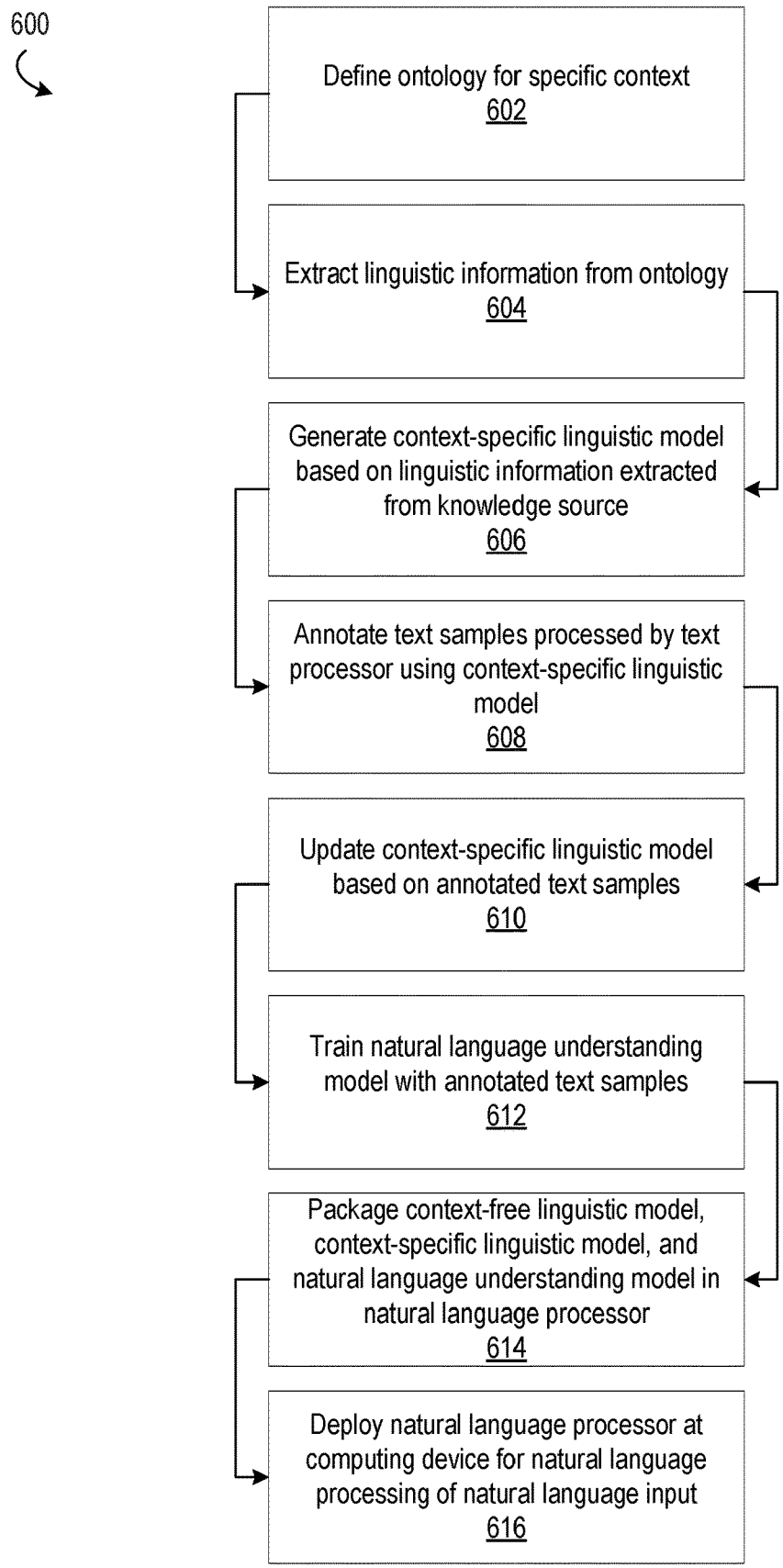
FIG. 6 depicts a flowchart of example method steps for developing a natural language processor having a context-specific linguistic model in accordance with various aspects described herein.

Referring now to FIG. 6, a flowchart 600 of example method steps for developing a natural language processor having a context-specific linguistic model is shown. A priori knowledge of the context is defined through various knowledge sources such as an ontology (block 602) as described above with reference to FIG. 1. The linguistic information included in the knowledge sources is extracted (block 604). A context-specific linguistic model is generated based on the linguistic information extracted from the knowledge sources (block 606) as also described above. For example, transform rules may be generated based on the linguistic information extracted from the ontology.

Text samples are annotated (block 608) as described above. For example, an annotation module of the natural language processor development system may facilitate the annotation process. The context-specific linguistic model may then be updated based on the annotated text samples (block 610). For example, context-specific transform rules may be generated based on the annotated text samples and included in the context-specific linguistic model.

A natural language understanding model is then trained using the annotated text samples (block 612) as described above using information obtained from the annotations and the text processor. The context-specific linguistic model may then be packaged in a natural language processor with a context-free linguistic model and a natural language understanding model (block 614). In some example implementations, only the context-specific linguistic model may be packaged with the natural language processor, and the context-free linguistic model may be deployed to an end-user device prior to or subsequent to the natural language processor. For example, the natural language processor may be configured to fetch the context-free linguistic model on demand as needed. A context-specific linguistic model may also be fetched on demand as needed in some example implementations. As noted above, a text processing model may include the context-specific linguistic model. The natural language processor may then be deployed at a computing device for natural language processing of natural language input (block 616). As also noted above, the computing device the natural language processor is deployed to may be an end-user computing device or a server (e.g., a natural language processing server). As set forth above, the techniques described herein related to the context-specific linguistic module advantageously improve the process of developing a natural language processor and subsequently improve the natural language understanding results generated by those natural language processors.

While not shown in FIG. 6, some implementations may permit natural language training samples to be accompanied by supplemental linguistic information, perhaps associated with the dialog state of the application, or information simulating user profile data. For example, dialog state information can be used to guide which transform rules are enabled for a particular sample. Examples of user profile data can be learned from a training sample and added as a supplement to the context-free and context-specific linguistic models during training, emulating the knowledge push that may otherwise occur at runtime.

Figure 7:
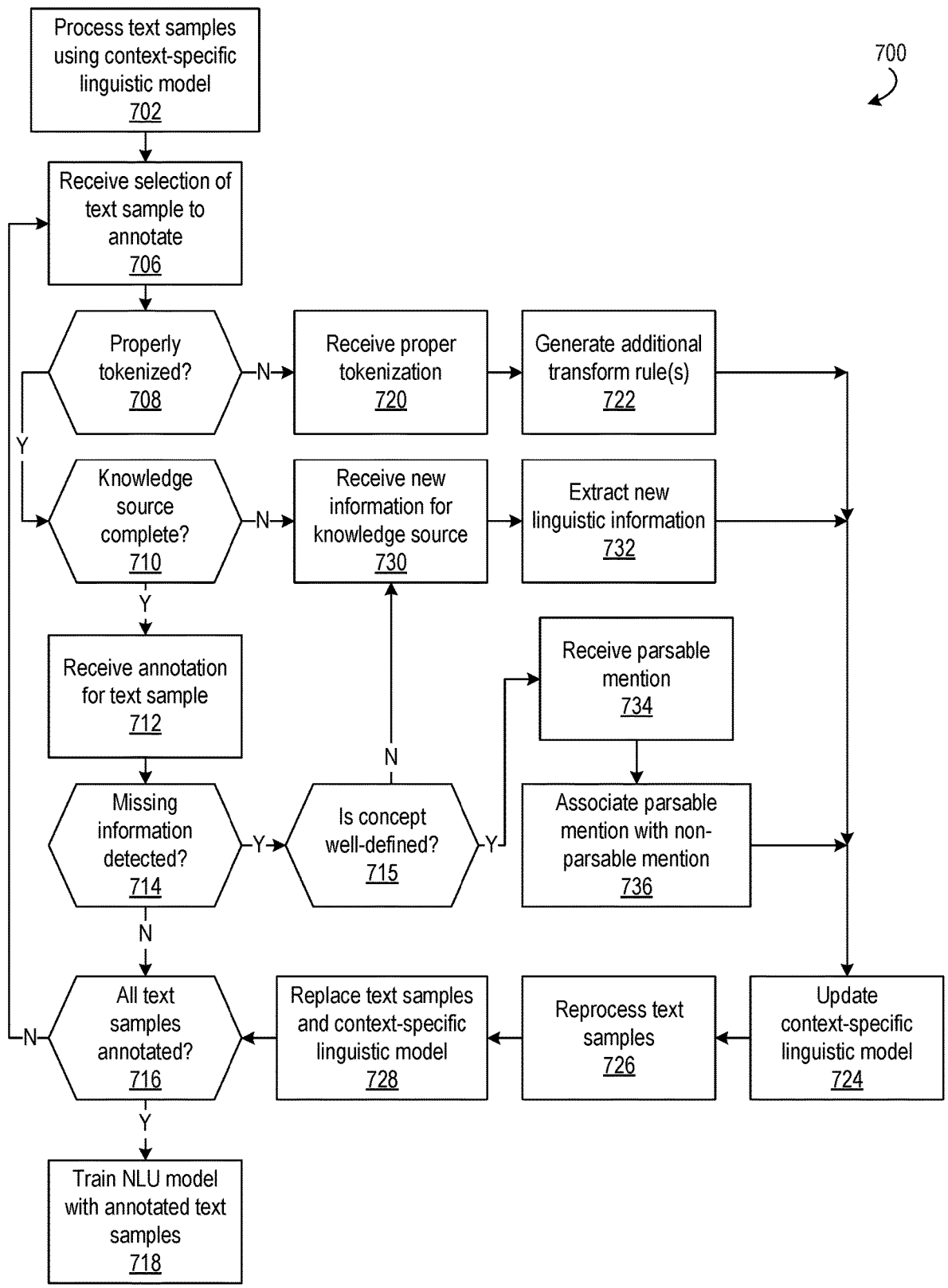
FIG. 7 depicts a flowchart of example method steps for annotating text samples in accordance with various aspects described herein.

Referring now to FIG. 7, a flowchart 700 of example method steps for annotating text samples in accordance with aspects of the present disclosure is shown. A set of text samples may be processed using a linguistic model (block 702) to generate a set of linguistic processing results for each one of the text samples. As described above, processing the text samples may include tokenization and normalization of the text samples. A selection of one of the text samples to be annotated may be received (block 706), at the annotation module.

If the selected text sample has been properly tokenized (block 708:Y), and the knowledge source contains all information necessary for the annotation of this sample (block 710:Y), then the annotation for the text sample may be received (block 712), e.g., from a developer via the annotation module. As noted above, the annotation may include semantic information for the selected text sample, e.g., one or more intents, mentions, and canonical forms. Once annotated, the annotation module may determine if information for the annotation is missing (block 714), such as whether the annotation contains unparsable mentions. If the no information is missing for the annotation (block 714:N), then the annotation for the text sample may be considered complete. If there are additional text samples to annotate (block 716:N), then a selection of the next text sample to annotate may be received (block 706), and the steps may be repeated to annotate the next text sample. If all text samples have been annotated (block 716:Y), then a natural language understanding model may be trained using the annotated text samples (block 718).

If, however, the selected text sample is not properly tokenized after processing (block 708:N), then the proper tokenization for the text sample may be received (block 720), e.g., from the developer via the annotation module. One or more additional transform rules may then be generated based on the tokenization information received (block 722). The context-specific linguistic model may be updated (block 724) based on the additional transform rules generated, e.g., by adding the additional transform rules to the context-specific linguistic model. The text samples may be reprocessed using the updated linguistic model (block 726), e.g., to generate a new set of text samples. If the developer prefers the new set of text samples and the updated context-free linguistic model in favor of the previous set and previous model, the new set and the new model may replace the previous ones for the annotation procedure (block 728). The annotations on text samples that were previously annotated are automatically transferred to the new text samples by transferring the annotation covering one or more tokens generated on a section of the original string to the one or more tokens generated on the same section of the original string by the upgraded application specific linguistic model.

If the knowledge sources appears to be incomplete (block 710:Y) (e.g., missing a concept), then additional information can be added to the knowledge source (block 730). New linguistic information may be extracted from the updated knowledge source (block 732), and the context-specific linguistic model may be updated (block 724) based on the new linguistic information extracted. The updated knowledge source may include, e.g., new context-specific vocabulary terms and new context-specific transform rules. The text samples may again be reprocessed using the updated context-specific linguistic model (block 726), and the previous set of text samples and previous context-specific linguistic model may be respectively replaced with the new set of text samples and updated context-specific linguistic model and annotations are transferred to the new text samples (block 728). If all text samples have been annotated (block 716:Y), then a natural language understanding model may be trained using the annotated text samples (block 718).

As noted above, after annotating a text sample, some missing information might be detected (block 714:Y) such as, e.g., a canonical form that cannot be obtained through the information available. For example, the knowledge source might be missing information for handling the information in the text samples. Accordingly, if the concept is not well-defined in the knowledge source (block 715:N), then the missing information may be received added to the knowledge source (block 730). As another example, the text processor may not generate all the necessary information (e.g., parsable mentions) for the text samples. Accordingly, if the concept is well-defined (block 715:Y), but the text sample is missing a parsable mention, the developer can indicate what parsable mention should have been included to the affected tokens (block 734) and a transform rule might be generated to associate parsable mention received with the tokenization in the context-specific linguistic model (block 736). As described above, a new context-specific linguistic model may be generated (block 724), the text samples may again be reprocessed using the updated context-specific linguistic model (block 726), and the previous set of text samples and previous context-specific linguistic model may be respectively replaced with the new set of text samples and updated context-specific linguistic model and annotations are transferred to the new text samples (block 728). If all text samples have been annotated (block 716:Y), then a natural language understanding model may be trained using the annotated text samples (block 718).

As seen in FIG. 7 and demonstrated above, the annotation techniques described advantageously allow a developer to update a context-specific linguistic model on a per-sample basis in order to further customize the linguistic model in a stepwise fashion with vocabulary terms and transform rules that affect tokenization and normalization.

Figure 8:
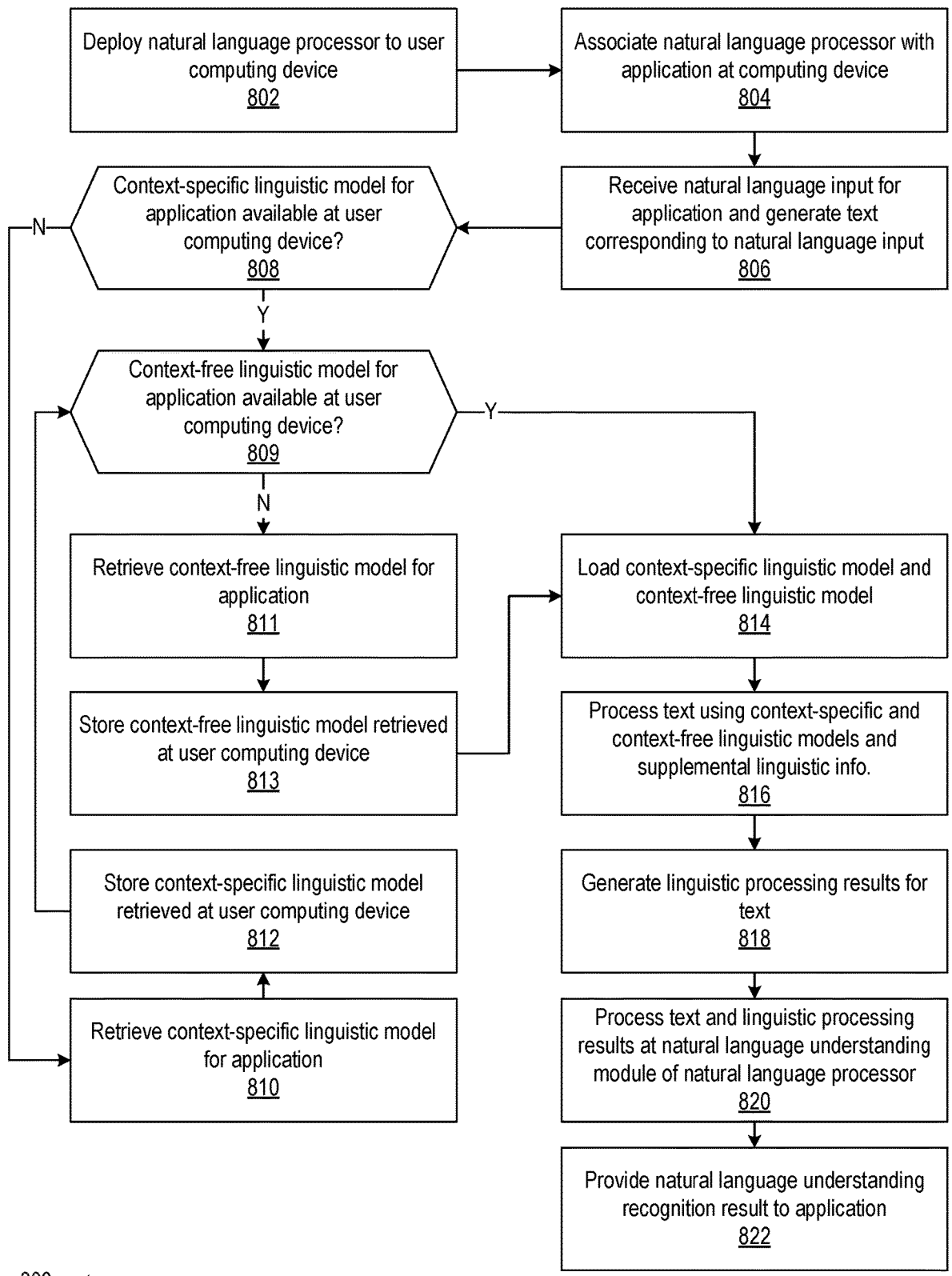
FIG. 8 depicts a flowchart of example method steps for natural language processing using a context-specific linguistic model in accordance with various aspects described herein.

Referring now to FIG. 8, a flowchart 800 of example method steps for natural language processing using a context-specific linguistic model is shown. A natural language processor may be deployed to a user computing device (block 802). The natural language processor may be associated with an application residing at the user computing device (block 804) such that the natural language processor is set up to perform natural language processing for natural language input received for the application.

When natural language input is then received for the application and text corresponding to the natural language input is generated (block 806), the natural language processor may determine whether a context-specific linguistic model for the application is available at the user computing device (block 808). If the context-specific linguistic model for the application is not available at the user computing device (block 808:N), then the natural language processor may retrieve the context-specific linguistic model for the application (block 810), e.g., by submitting a request to a remote server for the context-specific linguistic model for the application. Having retrieved the context-specific linguistic model for the application, the natural language processor may store the context-specific linguistic model at the computing device (block 812).

Once the context-specific linguistic model is available, the natural language processor may determine whether a context-free linguistic model referred by context-specific linguistic model for the application is available at the user computing device (block 809). If the context-free linguistic model for the application is not available at the user computing device (block 809:N), then the natural language processor may retrieve the context-free linguistic model for the application (block 811), e.g., by submitting a request to a remote server for the context-free linguistic model for the application. Having retrieved the context-free linguistic model for the application, the natural language processor may store the context-free linguistic model at the computing device (block 813).

Once both model are available the natural language processor load the context-free and context-specific linguistic model (block 814), and process the text using the linguistic models (block 816), e.g., at a text processing module of the natural language processor. Having processed the text, the natural language understanding module generates text and linguistic processing results for the text (block 818) as described above. The text and its corresponding linguistic processing results are thus suitable for semantic analysis. The natural language understanding module may thus process the text and its linguistic processing results (block 820) to generate a natural language understanding recognition result that includes semantic information. The semantic information may include one or more intents and one or more mentions that have been identified in the input received. The natural language understanding module may provide the recognition result to a software application (block 822) which may invoke some functionality it is configured to perform based on the natural language understanding recognition result received.

Figure 9:
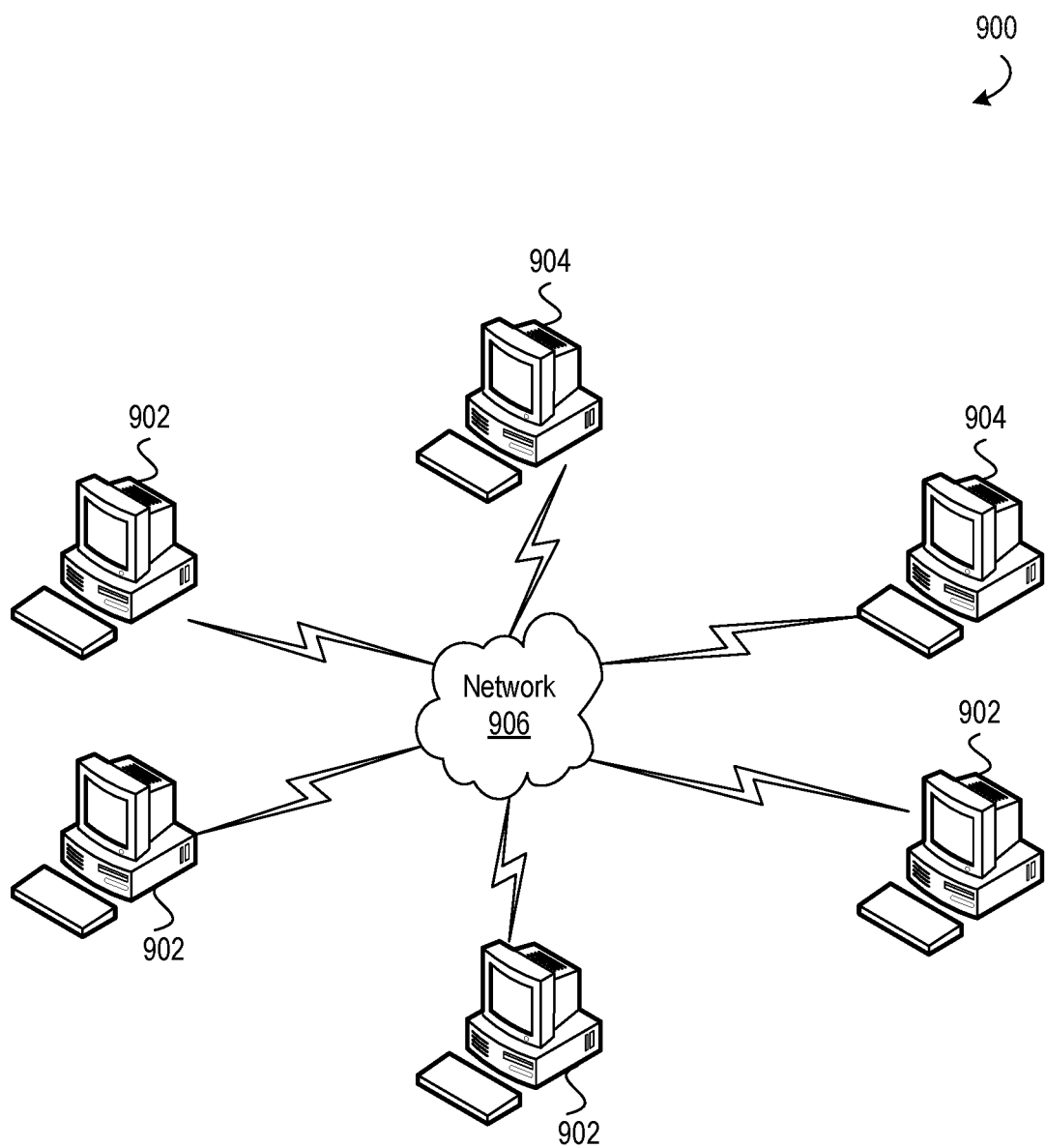
FIG. 9 depicts an example of an implementation of a computing environment in which aspects of the present disclosure may be implemented.

In FIG. 9, an example of an implementation of a computing environment 900 in which aspects of the present disclosure may be implemented is shown. Client computing devices 902 and server computing devices 904 provide processing, storage, and input/output devices executing application programs and the like. Client computing devices 902 may include, e.g., desktop computers, laptop computers, tablet computers, palmtop computers, smartphones, smart televisions, and the like. Client computing devices 902 can also be linked through communications network 906 to other computing devices, including other client devices computing devices 902 and server computing devices 904. Communications network 906 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Figure 10:
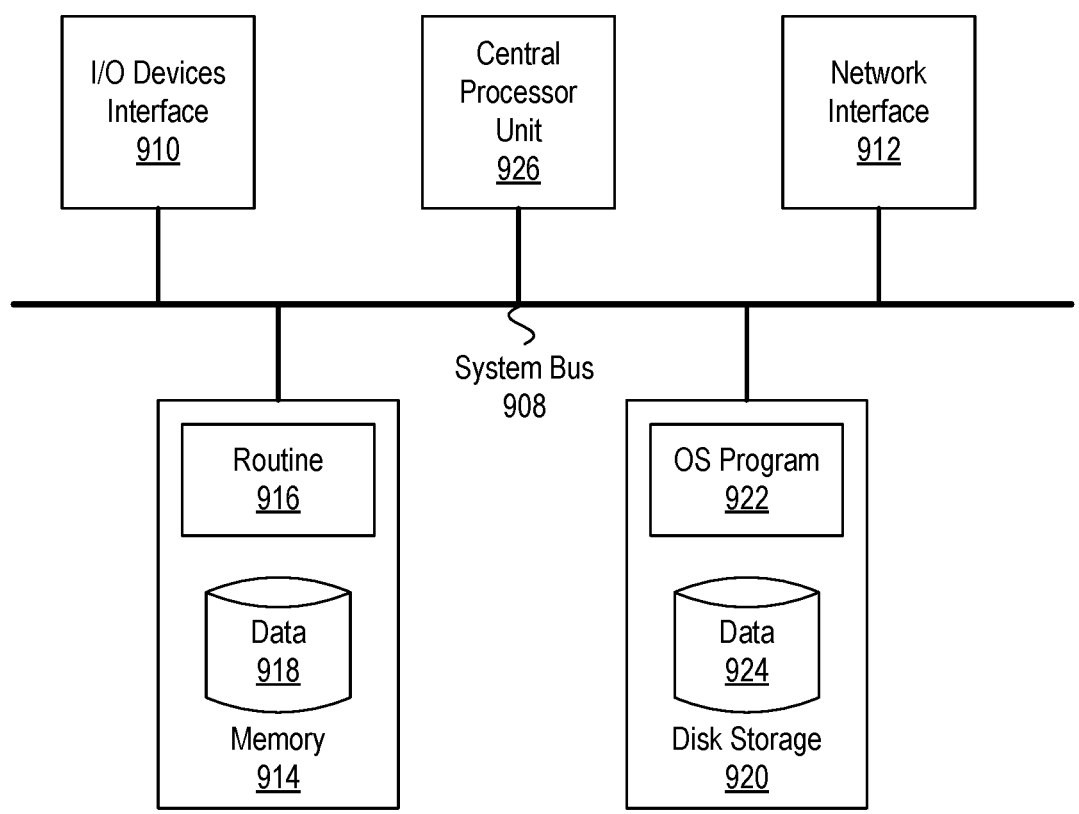
FIG. 10 depicts a block diagram of one of the computing devices of the computing environment of FIG. 9.

In FIG. 10, a block diagram of one of the computing devices 902 or 904 of the computing environment 900 of FIG. 9 is shown. The computing device 902 or 904 contains system bus 908, where a bus is a set of hardware lines used for data transfer among the components of a computing device or processing system. Bus 908 is essentially a shared conduit that connects different elements of a computing device (e.g., processor, disk storage, memory, input/output ports, network ports, etc.) that enables the transfer of information between the elements. Attached to system bus 908 is I/O device interface 910 for connecting various input and output devices (e.g., keyboard, mouse, microphone, camera, displays, printers, speakers, etc.) to the computing device 902 or 904. Network interface 912 allows the computing device to connect to various other devices attached to a network (e.g., network 906 of FIG. 9). Memory 914 provides volatile storage for computer software instructions 916 and data 918 used to implement aspects described herein (e.g., a recommendation engine implementing the steps detailed above). Disk storage 920 provides non-volatile storage for computer software instructions 922 and data 924 used to implement various aspects of the present disclosure. Central processor unit 926 is also attached to system bus 908 and provides for the execution of computer instructions.

In one implementation, the processor routines 916 and 922 as well as data 918 and 924 are a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. The computer program product can be installed by any suitable software installation procedure, as is well known in the art. At least a portion of the software instructions may also be downloaded over a cable, communication and/or wireless connection. Computer-readable media include all computer-readable media but do not include transitory propagating signals.

One or more aspects of the disclosure may be implemented using computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various implementations. In addition, the functionality may be implemented in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Additional aspects are described below.

Aspects of the disclosure relate to the use of a context-specific linguistic model and a context-free linguistic model to derive an optimal feature set from text, for natural language processing. The use of the context-specific linguistic model and the context-free linguistic model generates an optimal feature set from a set of text sentences to train a natural language model. The use of the context-specific linguistic model and the context-free linguistic model generates an optimal feature set from natural language input at runtime for natural language processing in conjunction with the trained natural language model.

A device may comprise a processor unit; an input interface configured to receive input and generate a digital signal corresponding to the input; a data store containing at least one context-free linguistic model, a context-specific linguistic model, and a natural language understanding model; and memory storing instructions that, when executed by the processor unit, cause the device to obtain input text based on the digital signal, process the input text using the context-free linguistic model and the context-specific linguistic model to generate processed input text, and process the processed input text using the natural language understanding model to generate a natural language understanding result capturing the intent and concepts contained in the input text.

According to some aspects, the input text is text submitted directly by an end user or as the output from an automatic speech recognition (speech-to-text) process.

According to some aspects, the context-free linguistic model comprises first linguistic information applicable to a plurality of contexts; and the context-specific linguistic model comprises second linguistic information applicable to a context that is not one of the plurality of contexts.

According to some aspects, the second linguistic information is extracted from one or more knowledge sources for the context, one example of which is an ontology.

According to some aspects, the first linguistic information comprises a first lexicon; and the second linguistic information comprises a second lexicon different than the first lexicon; the effective lexicon used for text linguistic processing is the combination of the first lexicon and the second lexicon.

According to some aspects, the second linguistic information comprises a set of transform rules configured to be applied to the input text. The set of transform rules comprises rules that affect the tokenization of the input text, and rules that affect normalizations of the tokenized text. The set of transform rules that alter the tokenization for a portion of the input text, alter tokens in situ (existing tokens are combined, split and/or recombined). The set of transform rules that specify a normalization for a portion of the tokenized text do so by adding new paths (variations) to the result of processing the text. The set of transform rules comprises a transform rule that may filter undesirable variations (paths), or rank variations and annotate the linguistic processing results with their relative priorities.

According to some aspects, the context-specific model may include parameters to guide the tokenization and normalization.

According to some aspects, the context-specific linguistic model is used to ensure that all application components developed independently are aligned with one another by generating a representation of the data that can be digested by each of those components.

According to some aspects, the natural language understanding model has been trained using a set of annotations corresponding to a set of text samples that have been processed using the context-specific linguistic model and the context-free linguistic.

According to some aspects, the context-specific model may be embedded within the natural language processing model as a convenience, and to ensure all models required for processing text at runtime, are available to the device.

According to some aspects, an application specific linguistic model is one example/type of context-specific linguistic model.

A method may be performed wherein the natural language input annotated for training have been annotated on a single form (tokenized, ASR, raw text input . . . ) and where the annotations are projected on the others forms as needed.

According to some aspects, changes in the application knowledge sources (for example the ontology) of an application trigger the regeneration of the context-specific model, and the variations as features leading to a new natural language understanding model. Annotations which are still valid following an upgrade to the application specific linguistic model are retained thus simplifying the annotation workflow. Annotations are retained by transferring the annotation covering one or more tokens generated on a section of the original string to the one or more tokens generated on the same section of the original string by the upgraded application specific linguistic model.

According to some aspects, the original sentences are retained and all the variations are used to generate additional natural language understanding features, rather than the more common approach of replacing the natural language understanding training input by the most likely normalization.

A method may include steps comprising receiving natural language input at a natural language input interface of a computing device; generating input text corresponding to the natural language input; processing the input text using a context-free linguistic model and an context-specific linguistic model to generate processed input text, and optimal linguistic processing results for natural language understanding processing; and processing the optimal linguistic processing results using a natural language understanding model to generate a natural language understanding recognition result corresponding to the natural language input.

According to some aspects, the natural language input can be accompanied by supplemental linguistic information, perhaps associated with the dialog state of the application, or information specific to the current user. For example, the user's contact list, additional transform rules or configuration directives. If available, said information is combined with the context-free linguistic model and the context-specific model for the duration of that human-machine turn.

This guarantees optimal text processing where the natural language processing may also be specialized for the particular human-machine turn.

According to some aspects, the steps include determining that the context-specific linguistic model is not stored at a local data store of the computing device; submitting a request for the context-specific linguistic model from a remote location; receiving the context-specific linguistic model from the remote location; and storing the context-specific linguistic model at the data store.

According to some aspects, the steps include deleting another context-specific linguistic model loaded into a cache of the computing device prior to loading the context-specific specific model into the cache; and loading the context-specific linguistic model from disk storage of the computing device into the cache. The instructions, when executed by the processor unit, further cause the device to load the context-free linguistic model from the data store if not already in the cache as required by the context-specific linguistic model. The instructions, when executed by the processor unit, further cause the device to retrieve the context-specific linguistic model from a remote location, and store the context-specific linguistic model at the data store. The context-specific linguistic model has encoded within it, during the annotation phase of a training session, the identity of the context-free linguistic model it is meant to be used with (so the runtime components can be best matched). Parameters comprised by the second linguistic model may enable or disable transform rules encoded into the context-free linguistic model. Input to be processed by the device can be received on a turn basis, or as a batch request.

A computer-readable storage medium having instructions stored thereon which, when executed by a processor unit of a computing device, cause the computing device to perform steps that include, receive natural language input at a natural language input interface of the computing device; generate input text corresponding to the natural language input; process the natural language input using a context-free linguistic model and a context-specific linguistic model and conditionally additional linguistic information supplied specific to the application dialog state or the user involved in the human-machine interaction to generate processed input text, and optimal linguistic processing results for natural language understanding processing; and processing the optimal linguistic processing results using a natural language understanding model to generate a natural language understanding recognition result corresponding to the natural language input; provide the natural language understanding result to an application residing at the computing device; wherein the context-free linguistic model comprises first linguistic information applicable to a plurality of contexts; wherein the context-specific linguistic model comprises second linguistic information extracted from one or a plurality of knowledge sources for that application such as the ontology, defined for a context that is not one of the plurality of contexts; and wherein the natural language understanding model has been trained using a set of annotations corresponding to a set of text samples that have been processed using the context-specific linguistic model and context-free linguistic model.

According to some aspects, the linguistic processing results of the text comprise one or more of a rank value for one of the linguistic processing results, a priority value for one of the linguistic processing results, and combinations thereof.

According to some aspects, the context-specific linguistic model is embedded in the natural language understanding model.

According to some aspects, the context-specific linguistic model comprises information identifying the context-free linguistic model.

According to some aspects, the context-specific linguistic model is an application-specific linguistic model that corresponds to a software application residing at the device, and the recognition result is provided to the software application.

According to some aspects, obtaining the text based on the digital signal comprises receiving the text from an automatic speech recognizer that generated the text based on the digital signal.

According to some aspects, the knowledge source comprises an ontology for the context.

According to some aspects, the one or more transform rules comprise at least one of a first transform rule that assigns to at least one of the one or more linguistic processing results a rank value, a second transform rule that assigns to at least one of the one or more linguistic processing results a priority value, and combinations thereof.

According to some aspects, the automatic speech recognizer resides at the computing device.

According to some aspects, a request for a context-specific linguistic model transmitted from a computing device to a remotely located computing device indicates a context in which the input was received.

According to some aspects, a computing device loads the context-specific linguistic model into a cache of the computing device.

According to some aspects, a computing device deletes, from a cache of the computing device, a context-specific linguistic model prior to loading another context-specific linguistic model into the cache.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
one or more processors;
a data store storing a context-free language model and a natural language understanding model;
an input interface configured to receive input and generate a digital signal corresponding to the input; and
memory storing instructions that, when executed by one of the processors, cause the system to:
obtain text based on the digital signal,
retrieve a context-specific language model from a remote server,
prior to performing semantic analysis of the text, process the text using the context-free language model and the context-specific language model to generate one or more linguistic processing results for the text,
perform a semantic analysis of both the text and at least one of the one or more linguistic processing results using the natural language understanding model to generate a natural language understanding recognition result that comprises at least one of an intent corresponding to the text and a mention corresponding to the text, and transmit the natural language understanding recognition result to an application executing on the one or more processors.

2. The system of claim 1, wherein:
the one or more linguistic processing results comprise one or more of a tokenization for a portion of the text, a normalization for a portion of the text, a sequence of normalizations for a portion of the text, and combinations thereof.

3. The system of claim 1, wherein:
the instructions, when executed by one of the processors, further cause the system to train a natural language understanding model using the text.

4. The system of claim 3, wherein:
the instructions, when executed by one of the processors, further cause the system to train a natural language understanding model using at least one of the linguistic processing results.

5. The system of claim 1, wherein:
the context-free language model comprises first linguistic information that is applicable to a plurality of contexts; and
a second context-specific language model comprises second linguistic information that is applicable to a context that is not one of the plurality of contexts.

6. The system of claim 5, wherein:
the second linguistic information has been extracted from at least one knowledge source associated with the context.

7. The system of claim 5, wherein:
the second linguistic information comprises one or more transform rules that control at least one of tokenization of a portion of the text, normalization of a portion of the text, and
combinations thereof.

8. The system of claim 7, wherein:
the one or more linguistic processing results comprise one or more tokens of the text;
the one or more transform rules comprise a transform rule that controls alteration of the one or more tokens; and
alteration of the one or more tokens comprises at least one of splitting one of the one or more tokens, combining at least two of the one or more tokens, and combinations thereof.

9. The system of claim 7, wherein:
the one or more transform rules comprise a transform rule that specifies a normalization for a portion of the text.

10. The system of claim 9, wherein:
the transform rule specifies the normalization for the portion of the text by adding to the one or more linguistic processing results a new normalization of a portion of the text.

11. The system of claim 7, wherein:
the one or more transform rules comprise a transform rule that removes from the one or more linguistic processing results an existing normalization for a portion of the text.

12. The system of claim 5, wherein:
the second context-specific language model comprises one or more configuration parameters that indicate whether one or more transform rules of the context-free language model are enabled or disabled.

13. The system of claim 1, wherein the input is associated with supplemental linguistic data indicating a user, and the memory storing instructions that, when executed by one of the processors, further cause the system to:
retrieve the context-specific language model from the remote server responsive to a determination that the user is associated with the context-specific language model, and that the context-specific language model is not stored in the data store.

14. A method comprising:
storing, at a data store, a context-free language model, and a natural language understanding model;
receiving input at an input interface of a computing device wherein the input interface is configured to generate a digital signal corresponding to the input;
obtaining text based on the digital signal;
retrieving a context-specific language model from a remote server;
prior to performing semantic analysis of the text, processing the text using the context-free language model and the context-specific language model to generate one or more linguistic processing results for the text, and
performing a semantic analysis of both the text and at least one of the one or more linguistic processing results using the natural language understanding model to generate a natural language understanding recognition result that comprises at least one of an intent corresponding to the text and a mention corresponding to the text.

15. The method of claim 14, further comprising:
training, at the computing device, the natural language understanding model using the text and at least one of the one or more linguistic processing results.

16. The method of claim 14, wherein the retrieving the context-specific language model from the remote server comprises:
determining a context associated with the text;
determining that the context is associated with the context-specific language model; and
determining, at the computing device, that the context-specific language model is not stored at a local data store of the computing device, and storing the context-specific language model including replacing the context-specific language model with a second context-specific language model.

17. The method of claim 14, wherein:
the context-specific language model comprises linguistic information comprising one or more transform rules that control at least one of tokenization of a portion of the text, normalization of a portion of the text, and combinations thereof.

18. The method of claim 17, wherein:
the one or more transform rules comprise at least one of a first transform rule that controls alteration of one or more tokens of the one or more linguistic processing results wherein alteration of the one or more tokens comprises at least one of splitting one of the one or more tokens, combining at least two of the one or more tokens, and combinations thereof, a second transform rule that specifies a normalization for a portion of the text by adding to the one or more linguistic processing results a new normalization for a portion of the text, a third transform rule that removes from the one or more linguistic processing results an existing normalization for a portion of the text, a fourth transform rule that assigns to at least one of the one or more linguistic processing results a rank value, a fifth transform rule that assigns to at least one of the one or more linguistic processing results a priority value, and combinations thereof.

19. A non-transitory computer-readable storage medium having instructions stored thereon that, when executed by a processor of a computing device, cause the computing device to perform operations comprising:
- storing, at a data store, a context-free language model, and a natural language understanding model;
- receiving input at an input interface of the computing device, wherein the input interface is configured to generate a digital signal corresponding to the input;
- obtaining text based on the digital signal;
- retrieving a context-specific language model from a remote server;
- prior to performing semantic analysis of the text, processing the text using the context-free language model and the context-specific language model to generate one or more linguistic processing results for the text; and
- performing a semantic analysis of both the text and at least one of the one or more linguistic processing results using the natural language understanding model to generate a natural language understanding recognition result that comprises at least one of an intent corresponding to the text and a mention corresponding to the text.

20. The computer-readable storage medium of claim 19, wherein:
- the one or more linguistic processing results comprise one or more of a tokenization for a portion of the text, a normalization for a portion of the text, a sequence of normalizations for a portion of the text, and combinations thereof.

* * * * *